United States Patent [19]

Greer

[11] 3,849,638

[45] Nov. 19, 1974

[54] SEGMENTED ASSOCIATIVE LOGIC CIRCUITS

[75] Inventor: David L. Greer, Manlius, N.Y.

[73] Assignee: General Electric Company, Syracuse, N.Y.

[22] Filed: July 18, 1973

[21] Appl. No.: 380,388

[52] U.S. Cl...................... 235/152, 307/207, 329/92

[51] Int. Cl........................................... H03k 19/20

[58] Field of Search.................... 235/152, 175, 176; 307/207, 203; 328/92; 340/172.5

[56] References Cited

UNITED STATES PATENTS

| | | | |
|---|---|---|---|
| 3,028,088 | 4/1962 | Dunham | 235/152 |
| 3,400,379 | 9/1968 | Harman | 340/172.5 |
| 3,584,205 | 6/1971 | Malaby et al. | 235/152 |
| 3,731,073 | 5/1973 | Moylan | 235/152 |
| 3,805,037 | 4/1974 | Ellison | 235/152 |

*Primary Examiner*—Charles E. Atkinson
*Attorney, Agent, or Firm*—Carl W. Baker; Richard V. Lang; Frank L. Neuhauser

[57] ABSTRACT

Disclosed are logic circuits, comprising an array of logic elements interconnected in segmented groups of arrangement and number such that together they can generate signals representative of any required number of Boolean functions in response to binary signals applied to the logic elements in the different groups. Segmentation of associative logic permits the implementation of multiple output Boolean logic functions and sequential logic functions with optimum use of a given array area. The segmentation structure of associative logic circuits can be fixed or it may be programmed to form a variety of patterns or groups, such programming being possible either at the time of manufacture or by electrical or mechanical means subsequent thereto.

10 Claims, 7 Drawing Figures

SEGMENTED ASSOCIATIVE LOGIC CIRCUITS

BACKGROUND OF THE INVENTION

This invention relates generally to associative logic circuits and more particularly to universal associative logic circuits for mass fabrication in semiconductor integrated circuit form for implementing multiple output Boolean functions and sequential logic functions. More specifically, the invention relates to associative logic circuit arrays of the type having circuits which may be electrically or mechanically reconfigured or programmed at the time of or subsequent to their manufacture to implement various types of Boolean functions.

Still more particularly, the present invention is related to and affords particular advantage for utilization in the associative logic circuits disclosed and claimed in the copending applications of the present inventor, David L. Greer, Ser. No. 248,572, now U.S. Pat. No. 3,816,725, entitled "Multiple Level Associative Logic Circuits," and Ser. No. 248,419 now U.S. Pat. No. 3,818,452 entitled "Electrically Programmable Logic Circuits," both filed Apr. 28, 1972, and both assigned to the assignee of the present invention. A further related application is Ser. No. 248,668, filed Apr. 28, 1972, by Joseph L. Mundy, and also assigned to the assignee of the present invention. This latter application of Mundy discloses an associative memory cell useful in implementing logic systems such as the associative logic circuits of the aforesaid Greer applications and of the present invention.

DESCRIPTION OF THE PRIOR ART

In recent years the production economies made possible by advances in semiconductor batch fabrication techniques have generated a trend toward large scale integration of digital systems. One of the factors which has encouraged this trend is the development of logic circuits and semiconductor devices characterized by regular or array geometry, semiconductor memories being among the better known examples of such array configurations or structures. In the light of successful development of semiconductor memories, design engineers have been prompted to apply similar technology also to the design of general purpose logic networks capable of performing or implementing both combinational and sequential logic functions.

Such known logic circuits involving array structures or configurations conventionally are essentially rectangular in shape with all column and row conductors extending the full height and width respectively of the arrays. A problem inherent in the use of such array configurations is that as the array becomes larger, due to increase in the number of logic cells, the logic elements tend to become progressively less efficient in their productive use of array area. Increasingly inefficient use of array area with increasing array size is due to the fact that each of the elementary logic functions when implemented in array form normally requires for its implementation an entire column or row conductor and the associated circuits, despite the fact that individual logic cells may have only small fan-in or fan-out requirements and actually utilize only very short conductor lengths. As a consequence, when the array is made larger as necessary to incorporate a larger number of logic elements, the column and/or row conductors must increase correspondingly, both in number and in length per conductor, which effectively multiplies or compounds the required increase in array area for each equivalent logic gate.

This increasingly inefficient utilization of array area with increasing array size is very undesirable both because of its impact on the total area requirement for an array and because of the resultant cost impact. Particularly when arrays are implemented in monolithic silicon or hybrid form, array area utilization considerations are very important in determining processing yield which in turn directly affects the cost of the array. Further, in logic circuit arrays of this type, wherein high speed circuitry is frequently desired, excessively long conductors add troublesome parasitic capacitance which tends to reduce the maximum speed capability of the circuits comprising the array.

SUMMARY OF THE INVENTION

The present invention obviates these problems of the prior art by providing logic circuit arrays which enable control of column and row conductor lengths selectively and as appropriate to the requirements of the individual logic elements constituting the array, thus making it possible to implement such complex logic as multiple output Boolean functions with optimized efficiency in the use of array area. The capability of providing different conductor lengths in a single array structure is achieved by segmenting selected ones of the column and/or row conductors to form two or more mutually independent collinear conductors in each such column or row. The conductors thus segmented, together with the logic elements associated therewith, are arranged in groups each of which may perform one or more logic functions such as AND and OR functions or combinations of these.

Such segmentation of the array makes it possible to effectively implement more than a single logic function in a single column or row. This also enables arrays of any size to be designed with most if not all the row and column conductors of optimum length, as determined by input/output and other requirements of the individual logic function associated therewith, rather than by the physical size of the total array. This in turn enables desired increase in logic capabilities of arrays with minimum increase in physical size thereof.

In practicing the invention, a segmented array can be designed and fabricated having any number of groups or segments each having any required lengths. These arrays can be designed either with fixed patterns of conductor segmentation or with the flexibility permitting electrical programming of the segmented patterns subsequent to fabrication of the arrays. Additionally, partial customizing during manufacture of the circuit arrays can be achieved by the use of a special masking step or by micromachining techniques, such as by use of laser beams. In fabricating the associative logic circuit array of the present invention in its perferred embodiment, all components such as resistors, transistors, conductors, etc. are formed on a substrate at the time of manufacture. Then, at the time the array is to be modified or programmed, these components are either connected or disconnected as appropriate by a custom mask, micromachining, electrical programming, or other method used to effect the conductor segmentation pattern desired.

As will be seen, the segmentation approach to logic implementation in accordance with the invention offers the important advantage of accommodating a wide variety of Boolean functions with only minor modifications of a single basic circuit array structure whereby maximum use of the logic elements which make up the circuit array is realized.

OBJECTS OF THE INVENTION

It is, therefore, an object of the present invention to provide a logic circuit array having a plurality of logic elements interconnected in segmented groups each of which may generate function signals in response to binary input signals provided to its logic elements.

Another object is to provide a programmable array of logic elements interconnected in columns and rows and including a number of segmentable circuits in each row adapted to be electrically or mechanically programmed to segment the rows of logic elements into groups representative of logic gates, to form logic circuits interconnected through the columns and rows capable of performing Boolean logic functions.

Still another object is to provide an electrically programmable logic device in monolithic form capable of being programmed one or more times subsequent to the manufacture of the device and having logic elements interconnected through row and column conductors wherein specified ones of the logic elements may be programmed to segment the rows and columns of logic elements into groups of logic for performing logic functions.

It is also an object of the invention to provide a programmable array of logic elements capable of being programmed to economically produce logic devices of large scale integrated circuit complexities with optimized utilization of array area.

BRIEF DESCRIPTION OF THE DRAWING

The present invention may be more readily described and understood by reference to the accompanying drawings in which.

DESCRIPTION OF PREFERRED EMBODIMENTS

The present invention is ideally suited to fabrication in integrated circuit form wherein a plurality of logic elements are formed by means of diodes, bipolar transistors, or metal oxide semiconductor (MOS) transistors implemented on a single crystal silicon substrate; e.g., P or N channel enhancement mode field effect transistors (FET), NPN or PNP bipolar transistors. The substrate may be of other material, however, such as germanium, silicon or silicon formed on sapphire, or other semiconductor substances. These logic elements may be programmed to form AND, OR, NOR, NAND or any other nondegenerate logic configuration utilizing either positive or negative logic notation. Of particular significance in the invention is the ability to program specified ones of these logic elements to establish open and closed circuit conditions through the conductors of the logic circuit array to segment the logic elements.

The present invention lends itself to the segmentation of both column and row conductors or either column or row conductors; however, for purposes of clarity and simplicity the ensuing discussion will deal with the segmentation of row conductors only. In addition, the logic circuit arrays to be described will deal with structures which assume logic functions in the sum of products form although products or sums are equally acceptable in practicing the invention.

Figure 1:
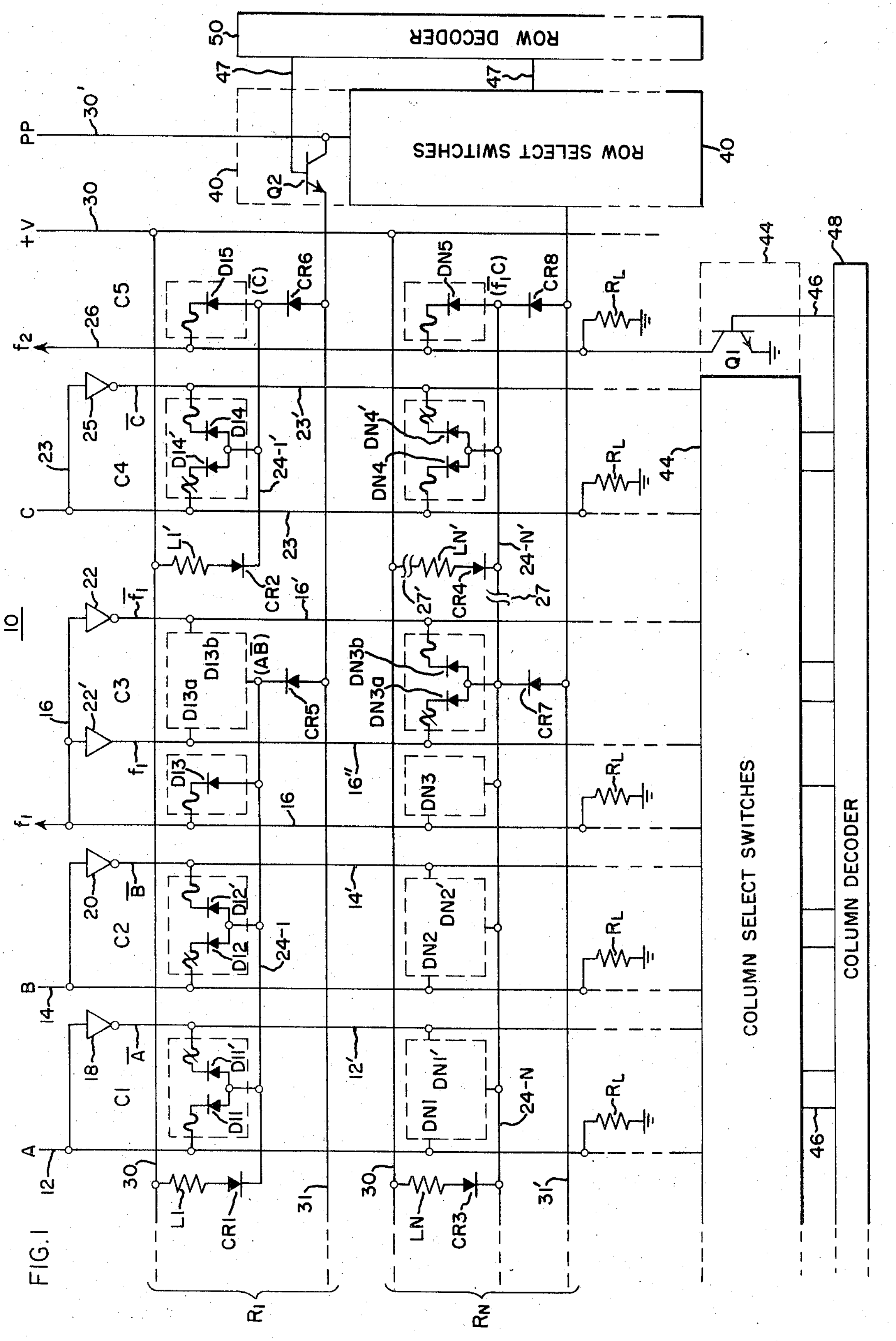
FIG. 1 is a circuit schematic in accordance with the invention utilizing diodes as logic elements and forming a segmented logic array for implementing Boolean functions.

Reference is now made to FIG. 1 which illustrates as one embodiment of the invention an array or logic circuit 10 utilizing bipolar semiconductor devices, such as diodes, arranged in a plurality of rows R1 through RN and columns C1, C2, C3, C4 and C5. Logic cells in row R1 are each comprised of diodes (D11, D11′), (D12, D12′), (D13), (D13*a*, D13*b*), (D14, D14′), and (D15). The number 1 immediately adjacent the D designates the row number. For example, row R1 is comprised of diodes (D11, D11′) through (D15), whereas row RN is comprised of diodes (DN1, DN1′) through (DN5). In a similar fashion, the second number to the right of the D designates a particular column of logic cells or diodes. That is, the cells comprising diodes (D11, D11′) are located in column C1 whereas the logic cells comprising diodes (D12, D12′) are located in column C2, and so on.

Each of the diodes of the cells includes first and second terminals shown as cathode and anode, respectively. Further, each of the logic cells includes a fusible link, one end of which is connected to the cathode of the corresponding diode, the other end being connected to a corresponding one of a plurality of column conductors such as conductors 12 and 12′ of column C1 and conductors 16 and 16′ or 16″ in column C3.

It will be noted that a plurality of binary variable signals A, B and C are applied through the fuse links to the cathodes of the diodes in each of the columns C1, C2 and C4 via conductors 12, 14 and 23, respectively, and that the corresponding $\overline{A}$, $\overline{B}$ and $\overline{C}$ signals are similarly applied through a plurality of identical logic inverters 18, 20 and 25 and conductors 12′, 14′ and 23′, respectively. Thus in column C1, for example, binary variable signal A is applied via conductor 12 to the cathode of each of the diodes D11 through DN1 (the latter diode not being shown); the inverted signal $\overline{A}$ is applied to the cathode of diodes D11′ through DN′ via conductor 12′.

Referring to row R1 there are shown first and second common conductors 24-1 and 24-1′ which are used for connecting together specified ones of the diodes to form groups or segmented groups of diodes in that row. For example, conductor 24-1 couples the anodes of transistors D11, D11', D12, D12', D13, D13*a* and D13*b*. Conductor 24-1' connects the anodes of diodes of D14', D14 and D15. Thus, the diodes associated with each of the conductors 24-1 and 24-1' comprise two segmented groups of logic elements for performing or implementing logical functions subsequently to be described.

Referring now to row RN, two conductors 24-N and 24-N' are also utilized to connect the various ones of the diodes in common as just described for row R1. As shown, however, conductors 24-N and 24-N' may comprise a single conductor or they may comprise two conductors as indicated by a break mark 27 separating the two conductors. In the fabrication of the circuit of FIG. 1, break mark 27 may be placed in conductor 24-N, 24-N' during the masking operation or subsequent thereto as by a laser beam micromachining process. Similarly, conductors 24-1 and 24-1' may be initially fabricated as shown or fabricated as a single conductor and subsequently segmented by a special micromachining step as preferred.

Each of the row conductors 24-1, 24-1', 24-N, and 24-N' is connected through a series coupled load resistor and diode to a voltage source +V via conductor 30. For example, in row R1, the left-hand group of logic cells receives a bias voltage (+V) via conductor 30, a resistor L1 and series diode CR1 having its cathode connected to conductor 24-1. In similar fashion, resistor L1' in series with diode CR2 provides bias voltage for the logic elements D14', D14 and D15 via conductor 24-1'. Row RN, in a similar fashion, contains series connected resistors and diodes LN, CR3 and LN', CR4.

Referring to resistor LN' in row RN it will be noted that there is a break 27' shown between the resistor LN' and conductor 30. This break is shown to indicate that if it is desirable to have the load resistor LN' and DN4 disconnected from the circuit, then through an appropriate micromachining or masking process a break or cut may be placed in the circuit, thus isolating LN' and CR4. Although it is not essential even in this case, such break would normally be provided when all of the logic elements in row RN are used to form a group of logic elements to perform a single logic function, i.e., when the row RN is not to be segmented.

Each of the conductors 24-1, 24-1', 24-N and 24-N' is connected to the cathode of a corresponding one of a plurality of diodes CR5, CR6, CR7 and CR8, respectively. The anodes of diodes CR5 and CR6 are connected together by a conductor 31 in row R1. Diodes CR7 and CR8 in row RN are also connected together in the same manner by another conductor 31'. The conductors 31 and 31' are each connected to the emitter of a one of a plurality of transistors Q2 (only one of which is shown) in a row select switch 40. Transistors Q2 provide a signal PP via conductors 30', 31 and 31' to the anodes of each of the diodes CR5 through CR8.

A row decoder 50 provides row address output signals on conductors 47 for sequential application to the bases of the transistors Q2. A column decoder 48 provides, in a manner similar to the row decoder 50, a column address output signal on each of conductors 46 to the base of a corresponding one of a plurality of transistors Q1, of which only one is shown, in a column select switch 44. Each of the transistors Q1 has its emitter terminal connected to a common potential such as ground, and its collector connected to a corresponding one of the column conductors. For example, Q1 in the right-hand portion of the column select switch 44 is connected to column conductor 26, whereas the transistors Q1 associated with column C1 are connected to conductors 12 and 12', and so on.

Reference is now made to column C3. A column conductor 16 serves as an output signal source for a function signal f1 and also provides a connection for signal f1 to the input of a logic inverter 22 and non-inverting isolation stage 22'. Conductor 16'' provides the function signal f1 to the cathodes of each of the diodes D13a through DN3a in the cells of column C3 via the associated fuse links of each of the diodes. Inverter 22 provides the complement of the signal f1, $\overline{\mathbf{f1}}$, to the cathode of each of the diodes D13*b* through DN3*b* via their corresponding fuse links.

In column C5, there is shown a conductor 26 connected to the cathode of diodes D15 through DN5 via their corresponding fuse links. Conductor 26 provides an output function signal *f2* as hereinafter explained.

Since the basic associative logic circuit to which segmentation of logic elements in accordance with the present invention is here shown applied is of the type disclosed in the previously mentioned Greer patent applications a detailed operational description of the embodiment of FIG. 1 particularly as related to the electrical programming of such circuits will not be presented herein, reference being made to those applications for this information. However, sufficient description will be presented for full understanding of the present invention.

As a result of programming the logic circuit of FIG. 1, certain of the fusible links will have been broken resulting in open circuits between the cathodes of selected diodes and their corresponding column conductors. Reference is now made to the logic cell in column C1 comprised of diodes D11 and D11' and their corresponding fuse links. The fuse link corresponding to diode D11' has a diagonal slash line extending through the link. Note also that other similar slash lines extend through several of the other fuse links within the circuit. These slash lines are used to represent an open fuse link produced as a result of programming the circuit. In contrast, those fuse links not having the diagonal slash are indicative of fuse links which have purposely not been open circuited during programming and which constitute the storage of a data item in the corresponding logic cells.

The operation of the circuit of FIG. 1 will now be described to illustrate how Boolean functions may be generated in accordance with the programmed pattern of the logic cells contained within the circuit. However, in the ensuing description, only the generation of one product term signal ($A\,\overline{B}$) as shown on conductor 24-1 and the generation of one function signal (*f1*) as shown on conductor 16 will be described.

Referring now to row R1 and specifically to conductor 24-1, there is shown the product term signal ($A\,\overline{B}$), which is representative of the states of the binary variable input signals A and B applied to the circuit on conductors 12 and 14, respectively. It will be noted that the fuse links associated with diodes D11 and D12' have not been open circuited. These two diodes in conjunction with the series connected load element L1 and diode CR1 comprise an AND gate, with inputs A and B, capable of producing either a plus voltage or a zero voltage or, assuming positive logic notation, a binary 1 or a binary 0 signal on line 24-1. The product term signal ($A\overline{B}$) will be generated as a binary 1 signal on conductor 24-1 only when the binary variable signals applied at inputs A and B are a binary 1 and 0 respectively; any other combinations of these signals will generate a binary 0.

Signal ($A\overline{B}$) is generated as a positive voltage signal in the following manner: Signal A is applied as a positive voltage via the fuse link to the cathode of diode D11, thus preventing diode D11 from conducting. Signal B after inversion at 20 becomes a positive voltage signal $\overline{B}$ applied to the cathode of diode D12' on conductor 14' via its associated fuse link. Diode D12' is thus prevented from being forward biased. Since both diodes D11 and D12' are prevented from conducting, conductor 24-1 will assume a positive potential as the result of the bias voltage applied through resistor L1 and diode CR1.

Referring now to column C3 and specifically to conductor 16, there is shown the signal f1 which is generated in response to a product term signal on conductor 24-1. By means of diode D13 in conjunction with the load resistor $R_L$ shown connected between the line 16 and ground, line 16 will assume the potential of line 24-1. Thus the function signal *f1* is generated as a binary 1 when conductor 16 assumes a positive voltage or when a positive signal representing ($A\overline{B}$) is applied to the anode of diode D13 driving the diode into conduction.

Reference is now made to conductor 26 of column C5. The diodes D15 and DN5 in column C5 together with the associated load resistor $R_L$ comprise an OR gate. An output function signal f2 on conductor 26 is generated when either one or both of input signals $\overline{C}$ on conductor 24-1' or ($\overline{f1}$C) on conductor 24-N' are binary 1's.

The generation of signal ($\overline{f1}$C) will now be described. The cells including diodes $DN3_b$ and DN4 have their cathodes connected to their associated column conductors via their respective fuse links. The binary variable signal C is applied to the cathode of diode DN4 on conductor 23. The function signal *f1* is applied, after inversion in logic inverter 22, to the cathode of diode $DN3_b$ on conductor 16'. When both signals $\overline{f1}$ and C are binary 1's, diodes $DN3_b$ and DN4 will not conduct, thus generating the binary 1 signal ($\overline{f1}$C) on conductor 24-N, 24-N'. It will be understood that in order to generate this particular logic function ($\overline{f1}$C), the conductor 24-N, 24-N' must be left electrically continuous and not segmented by any break as at 27, and that there may or may not be a break at 27' as preferred. The ($\overline{f1}$C) signal causes diode DN5 to conduct generating a binary 1 output signal *f2* on conductor 26.

Signal *f2* is also generated in response to the binary input signal C when C is a binary 0. When signal C applied to inverter 25 is a binary 0 it is inverted to a binary 1 preventing diode D14 from conducting. As a result, conductor 24-1' goes to a binary 1 causing diode D15 to conduct and again generating the output signal *f2* on conductor 26.

Figure 2:
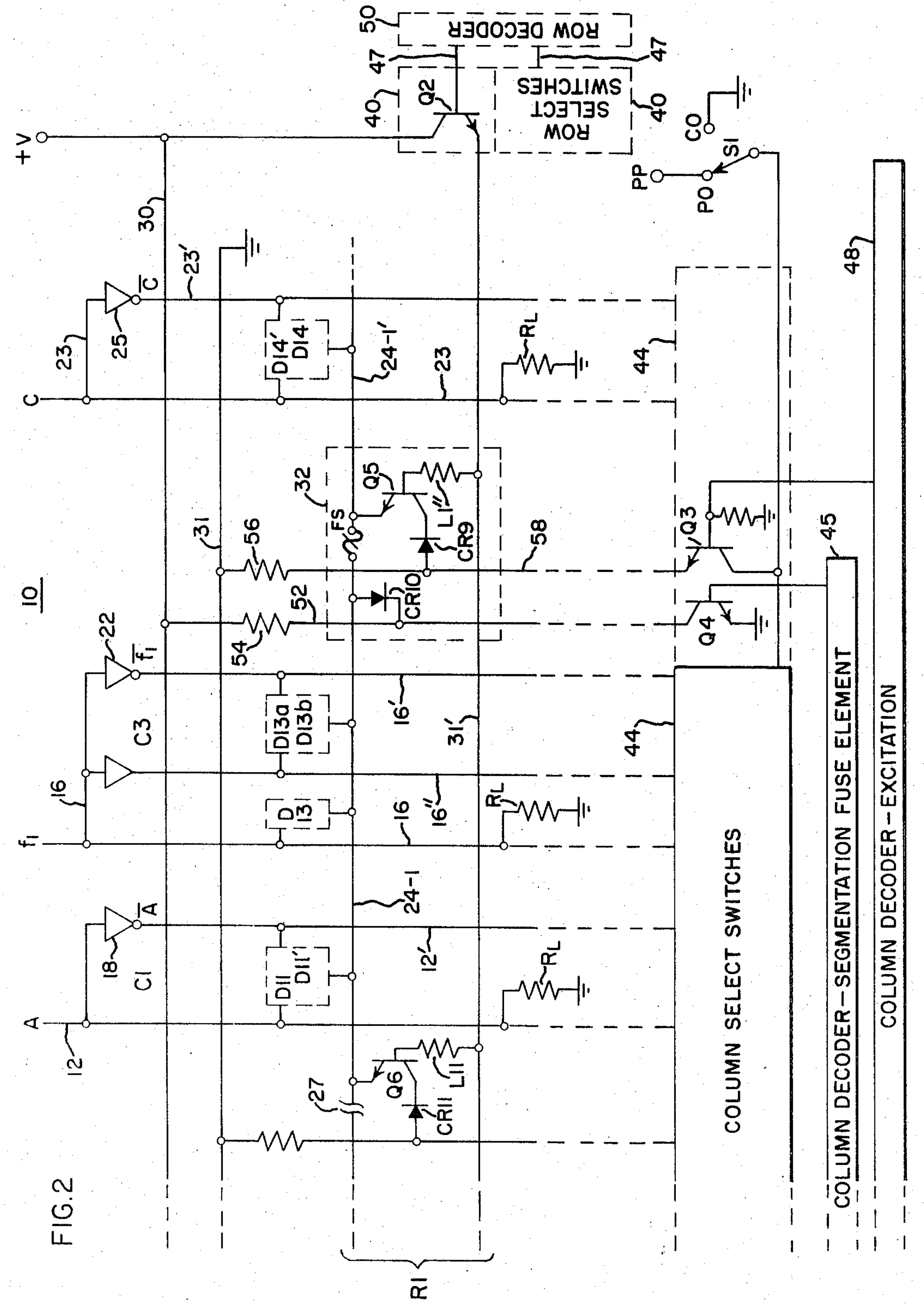
FIG. 2 is a circuit schematic of another embodiment of the invention incorporating diodes as logic cells and further including a circuit for electrically programming the array segmentation pattern subsequent to manufacture.

FIG. 2 illustrates another embodiment of the invention wherein like numbers and basically the same numbering scheme used in connection with FIG. 1 are incorporated where applicable. However, FIG. 2 shows only those logic cells and associated circuitry connected with row R1, all other rows being omitted from this figure. Additionally, for simplicity the diodes in each of the cells have been omitted from the dashed boxes although their numbers appear corresponding with those of FIG. 1. The embodiment of FIG. 2 is basically the same as that of FIG. 1, but in addition it shows a programmable segmentation circuit 32 which permits the row conductor 24-1, 24-1' to be open circuited by electrical means.

Segmentation of row conductor 24-1, 24-1' is effected by circuit 32 when fusible link FS is caused to melt or open-circuit. Circuit 32 is comprised of a diode CR10 having its anode connected to conductor 24-1 and its cathode connected to a column conductor 52. The column conductor 52 is connected to the +V line 30 through a resistor 54 and also to the collector of a transistor Q4 in the column select switches 44. An additional diode CR9 has its anode connected to a ground or zero potential conductor 31 via resistor 56. The anode of CR9 is also connected to the emitter of a transistor Q3 in the column select switches 44 via a column conductor 58. A transistor Q5 has its collector connected to the cathode of diode CR9 and its emitter connected to one side of the fuse FS and conductor 24-1'. The base of transistor Q5 is connected to the row conductor 31' via a load resistor L1'', row conductor 31' being connected to the emitter of Q2 of the row select switches 40.

Reference is now made to an additional circuit comprised of a diode CR11, a transistor Q6 and a load resistor L11 in the left-hand portion of column C1 of row R1. It will be noted that this circuit is quite similar to the segmentation circuit 32, with the exception that it does not include the fuse FS and the diode CR10. This latter circuit has been incorporated to show that, as an option, the circuit of FIG. 2 could be fabricated to show a break point 27 in conductor 24-1 similar to that shown in FIG. 1 on conductor 24-N, 24-N'. In the circuit of FIG. 2, the break point may be fabricated through a masking technique when the circuit is manufactured or it may be placed in the conductor through a laser machining technique as described in connection with FIG. 1. However, if desirable a circuit identical to that of 32 could be incorporated into column C1 merely by adding the diode CR10 and the fuse FS to the circuit.

The embodiment of FIG. 2 includes two decoders not shown in FIG. 1. These are column decoder-segmentation fuse select 45 and column decoder-excitation 48. During the programming of circuit 32 to achieve segmentation of the logic elements within row R1, the segmentation fuse select decoder 45 provides the proper signals to the base of transistor Q4. In a similar fashion, the excitation decoder 48 provides proper signals to the base of transistor Q3.

Shown to the right of the column select switches 44 is a switch S1 which is utilized to establish operation of the circuit in either its programming or normal operation modes. Switch S1 has two input terminals designated PO (for programming operation) and CO (for circuit operation), the latter terminal being connected to ground potential. The common terminal of switch S1 is connected to the collector of each of the transistors Q3 in the column select switches. When switch S1 is in the PO position, programming pulse (PP) from a program pattern generator (not shown) is supplied via switch S1 to the collector of each of the transistors Q3. Reference is made to the previously mentioned Greer patent application "Electrically Programmable Logic Circuits", Ser. No. 284,419, for detailed information regarding the operation of the programming pattern generator.

When programming the array of FIG. 2, conductor 24-1, 24-1' is segmented by melting the fuse link FS in segmentation circuit 32 in the following manner. Switch S1 is placed in the PO position. Transistors Q2, Q3 and Q4 are caused to conduct by simultaneously addressing their respective base electrodes. As transistor Q2 is driven into conduction, conductor 31' rises to the +V potential. A positive programming pulse PP is applied to the collector of Q3 which is in saturation, causing a positive signal to be applied to diode CR9 via conductor 58. Diode CR9 and transistor Q5 conduct, applying a positive voltage to the right-hand side of fuse link FS. The positive potential on line 24-1, 24-1' will cause CR10 to conduct, connecting the left-hand side of the fuse link to ground through column conductor 52 and transistor Q4. The resulting current in the fuse link causes it to open.

When circuit 32 is not being used for programming, diodes CR10 and CR9 are back-biased by two resistors 54 and 56 in column conductors 52 and 58, respectively. Diode CR9, thus back-biased, prevents collector current from flowing through transistor Q5 when the circuit array is in the circuit operation (CO) mode. Diode CR10 is back-biased in the CO mode to decouple line 24-1 from line 52.

In addition to segmentation programming as just described, the circuit of FIG. 2 may be programmed to open-circuit various ones of the fuse links in each of the logic elements such as those associated with D14 or D14', for example, for logic programming. For this, the switch S1 remains in the PO position and the operation of transistors Q2, Q3 and Q5 is as explained for the segmentation operation. However, during the logic programming operation, transistor Q4 is kept in the nonconducting state by a 0 or negative potential signal applied to its base from the segmentation fuse element decoder 45. Thus, with transistor Q4 nonconducting, the +V voltage is applied through resistor 54 to the cathode of CR10 keeping it reverse biased.

During circuit operation with switch S1 in the CO position, a ground potential signal is applied to the collector of each of the transistors Q3 preventing them from conducting. Diode CR9 is either zero or reverse biased since the resistor 56 is connected to ground via row conductor 31. Row decoder 50 now provides a positive signal to the bases of transistors Q2 in the row select switches 40, which holds them in saturated condition to thus provide +V voltage to the base of transistor Q5 via its associated load resistor L1''. During this circuit operation (CO) mode, the emitter base junction of transistor Q5 is utilized as a diode in series with the load resistor L1'' to provide the proper bias voltage for the logic element D14', D14.

Under these conditions it can be seen that when the signal C is a positive voltage or binary 1, such signal will be applied through diode D14' and its associated fuse link causing the diode D14' to be reverse biased allowing conductor 24-1' to rise to a positive potential or the binary 1 state of the input signal C. When the binary input signal C is at zero volts or a binary 0, diode D14' conducts causing transistor Q5, through its emitter-base diode junction, to also conduct resulting in conductor 24-1' being clamped to zero volts or a binary 0 state. The operation just described for transistor Q5, its associated base load resistor L1'' and diodes D14', is the same as for the circuit consisting of transistor Q6 and its base load resistor L11 in combination with diodes D11 and D11'.

Figure 3:
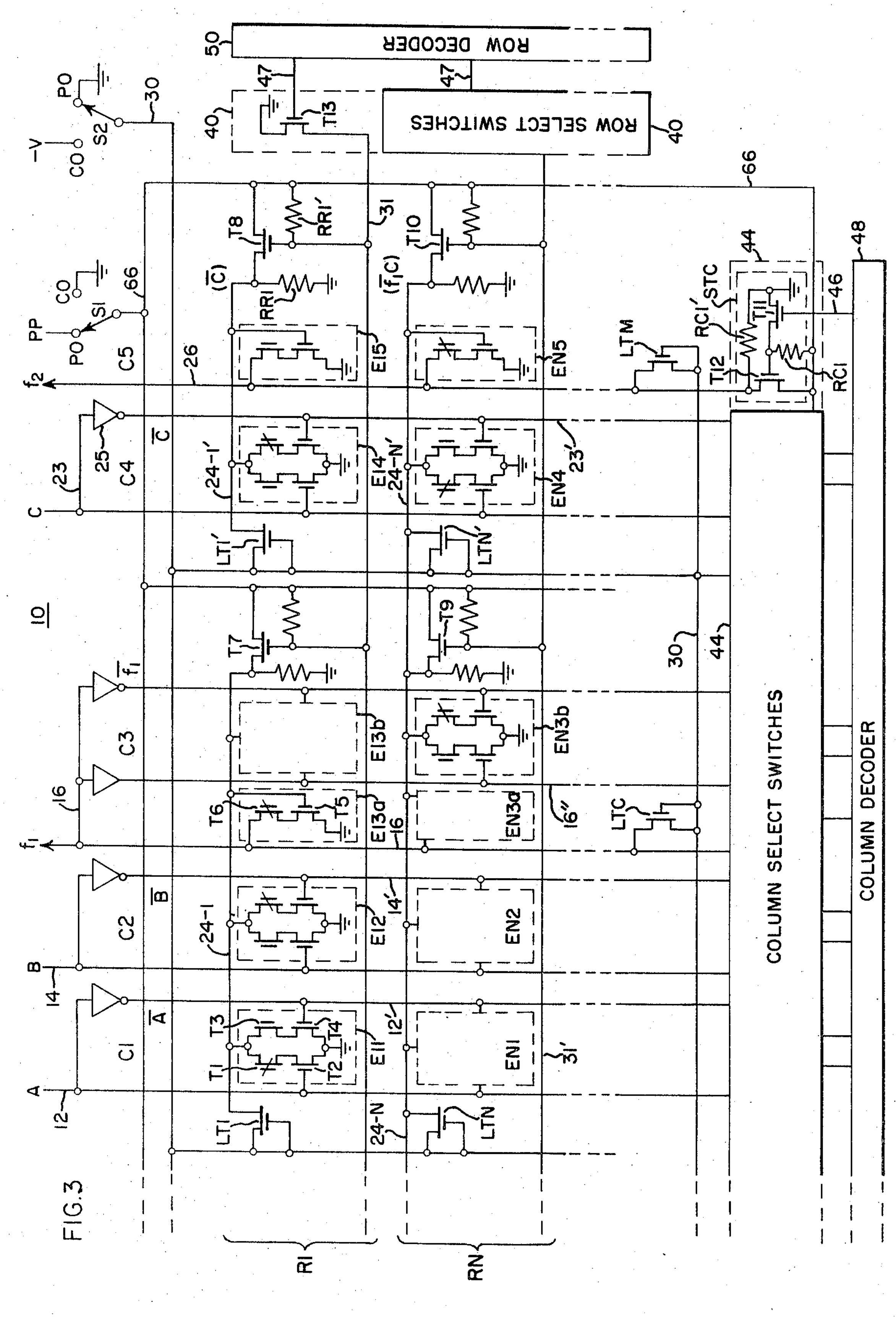
FIG. 3 is a circuit schematic of a segmented array in accordance with the invention utilizing MOS technology wherein field effect transistors are utilized as logic elements.

Reference is now made to FIG. 3 which illustrates another embodiment of the invention wherein like numbers and basically the same numbering scheme used in describing FIGS. 1 and 2 are used where applicable, i.e., the first digit following an E represents the row number and the second digit following the E represents the column number. In FIG. 3 instead of using diodes to form the logic elements, a plurality of P-channel enhancement mode field effect transistors (FET's) are interconnected to form each element. For example, in column C1, a typical logic element E11 is comprised of a plurality of transistors T1, T2, T3 and T4.

It will be noted that transistors T1 and T3 are floating gate type FET's. That is, their gate electrodes are not connected to any conductor, whereas the gate electrodes of transistors T2 and T4 have their gate electrodes connected to corresponding ones of the input conductors 12 and 12', respectively. Further, the source electrode of each of the transistors T2 and T4 is connected to a common potential ground and the drain electrodes are connected to the source electrodes of transistors T1 and T3, respectively. The drain electrodes of transistors T1 and T3 are connected in common to the row conductor 24-1. Each of the other elements such as EN1 in column C1, E12 through EN2 in column C2, E13*b* through EN3*b* in column C3 and E14 through EN4 in column C4 are identical to element E11 in column C1.

There are also logic elements comprised of two transistors. One such is shown at E13*a*, comprising two transistors T5 and T6. Transistor T5 has its gate electrode connected to conductor 24-1, its source electrode connected to ground and its drain electrode connected to the source electrode of transistor T6. Transistor T6 is a floating gate transistor and has its drain electrode connected to conductor 16 for providing the output function signal *f*1. Each of the other elements in column C3 and elements E15 through EN5 in column C5 are identical to element E13*a* as just described.

The embodiment of FIG. 3 is segmented similarly to FIGS. 1 and 2, with row R1 being segmented between elements E13*b* and E14. Each of the segments contains its own load element. Thus the segment of row R1 comprising elements E11, E12, E13*a* and E13*b* contains a load transistor LT1, the row R1 segment comprising elements E14 and E15 contains a load transistor LT1', and each of the segments of row RN has one of two load transistors LTN and LTN'. These load transistors have their gate and drain electrodes connected in common to conductor 30 which is connected to a switch S2 and their source electrodes connected to conductors 24-1, 24-1', 24-N and 24-N', respectively.

Switch S2 has two positions designated CO and PO. When in the PO position (for programming operation) a ground potential is applied via conductor 30 to each of the load transistors LT1-LTN and LT1'-LTN'. When in the CO position (for circuit operation) a voltage source —V is connected to each of the load transitors. Two additional load transistors, LTC and LTM, have their gate and drain electrodes connected in common to a conductor 30, which is connected via conductor 30 and switch S2 either to ground or to —V.

The source electrodes transistors LTC and LTM are connected to conductors 16 and 26, respectively.

Reference is now made to the column select switches 44 and to the circuit STC enclosed within dashed lines adjacent the right-hand end thereof. In this circuit a transistor T12 has its drain electrode connected via conductor 66 to switch S1 providing either a programming pulse (PP) or ground potential thereto. The T12 source electrode is connected to conductor 26 and also to one end of a resistor load RC1′ grounded at its other end. The T12 gate electrode is connected to the drain electrode of another transistor T11 and, through a resistor RC1, to conductor 66. The T11 source electrode is connected to ground while the gate electrode is connected to the column decoder 48 via one of a plurality of conductors 46. Other circuits identical to circuit STC as just described are connected to each of the other column conductors.

Referring next to the row select switches 40, transistor T13 has its source electrode connected to ground and its drain electrode connected via row conductor 31 to the gate electrodes of each of the transistors T7 and T8 of row R1. The gate electrode of T13 receives its input signals from the row decoder 50 via conductor 47. Other transistors identical to T13 are connected to each row conductor 31′ in successive rows represented as RN.

Transistor T7 and its associated circuit elements serve in programming the left-hand segment of row R1, and transistor T8 serves in like manner in programming the right-hand segment of row R1. Similarly, transistors T9 and T10 function in identical circuits for each of the segments of row RN. Since these circuits are identical, only that containing transistor T8 will be described in detail. The T8 source electrode is connected to row conductor 24-1′ and also is connected through a resistor RR1 to ground. The T8 drain electrode is connected to conductor 66 for receiving either the PP signal or ground potential through switch S1. The gate electrode of T8 is connected through resistor RR1′ to conductor 66 and, as previously described, also is connected to row conductor 31 for receiving row select signals from transistor T13 of the row select switches, during the programming operation.

Referring now to row RN and the two circuits comprised of transistor T9 and load transistor LTN, it will be understood that break points (not shown) may be provided in the row conductors 24-N, 24-N′ and the source electrode of transistor LTN, respectively as described above with reference to break points 27 and 27′ in the circuit of FIG. 1. These represent options available to the circuit designer to establish segmentation at various locations within the circuit.

Figure 4:
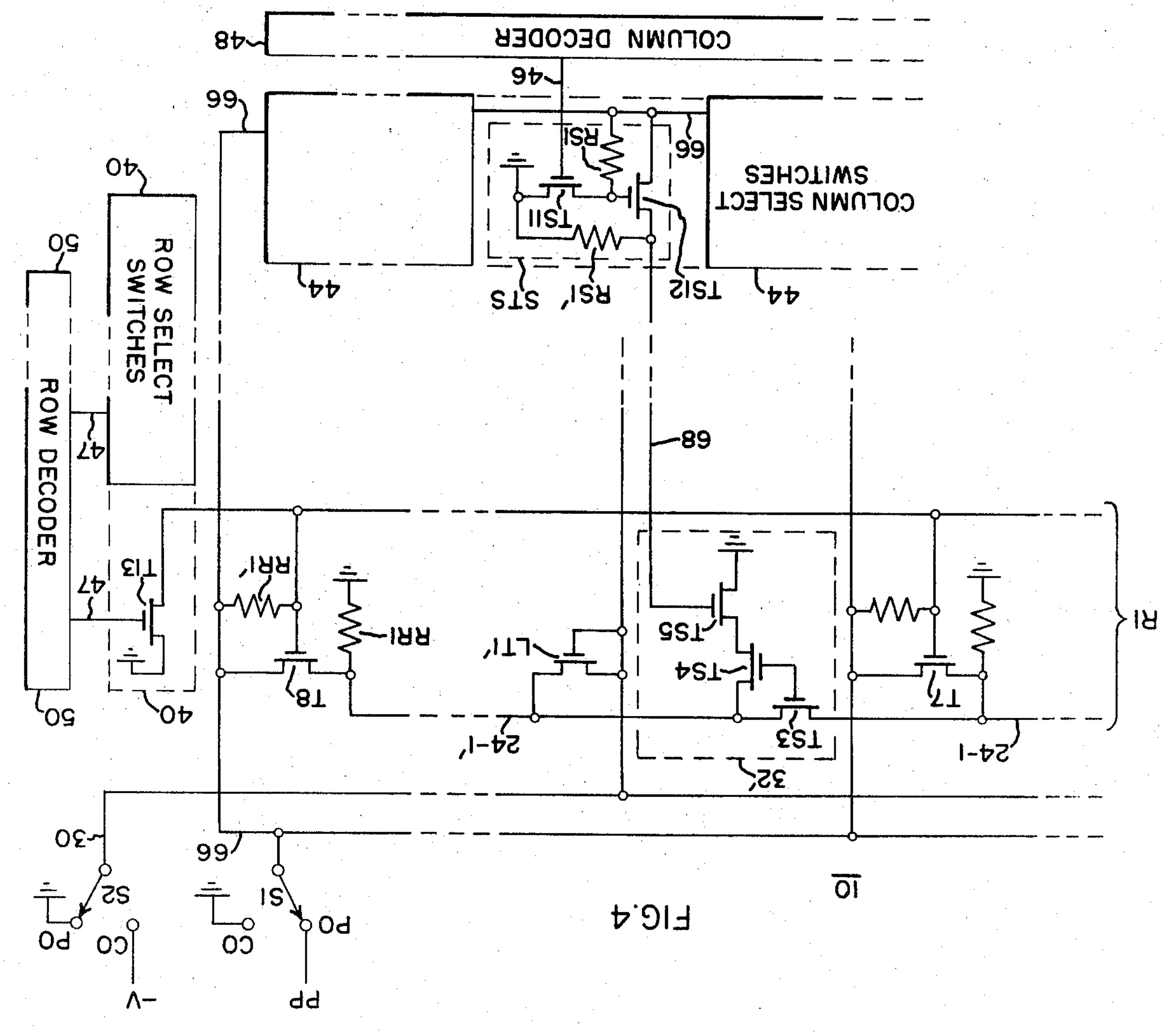
FIG. 4 is a schematic circuit diagram of a portion of an array utilizing field effect transistors wherein a programmable segmentation circuit is shown for incorporation into the embodiment of FIG. 3.

Reference is now made to FIG. 4 which shows another circuit permitting electrical programming of specified segmentation patterns. In programming the segmentation circuit 32′ of FIG. 4, two transistors TS3 and TS4, which preferably are of enhancement mode MOS type, receive and store information in the form of avalanche injected charges on their floating gates. With charge accumulation on their floating gates these transistors conduct; without such charge they present an open-circuit between their respective source and drain electrodes.

In the circuit 32′ of FIG. 4, transistors TS3 and TS4 have their gate electrodes tied together and so share a common gate. The TS3 drain electrode is connected to conductor 24-1 and the source electrode to conductor 24-1′. Transistor TS4 has its drain electrode also connected to conductor 24-1′ and its source electrode connected to the drain electrode of TS5. The TS5 source electrode is grounded and its gate electrode is connected to a conductor 68 and through a load resistor RS1′ to ground.

In manufacturing the circuit 32′ of FIG. 4, transistors TS3 and TS4 are fabricated having no charge stored on their electrodes. Before programming, therefore, transistor TS3 presents an open-circuit and conductors 24-1 and 24-1′ are segmented. If it is desired not to segment these conductors the circuit is programmed subsequent to manufacture to store an avalanche charge on the gate electrodes of TS3 and TS4. Transistor TS3 then will conduct, providing a closed circuit between 24-1 and 24-1′.

In programming the circuit of FIG. 4, switches S1 and S2 are placed in their respective PO positions. Switch S2 then grounds the column conductor 30 associated with each of the load transistors of which LT1′ in FIG. 4 is exemplary. Switch S1 passes the programming pulse PP to each of the circuits comprising transistors T7 and T8, as well as to the column select switches 44 of which circuit STS is exemplary. It will be noted that circuit STS as shown here is identical to circuit STC as previously described in connection with FIG. 3.

The programming pulse PP serves in substantially the same manner as previously described in connection with FIG. 2. However, in the case of FIG. 4, conductor 66 may be held at a DC bias voltage negative with respect to ground, in order to effect proper addressing of the circuit 32′. Typically such bias voltage may be −10 volts DC. When programming the segmentation circuit 32 the voltage on conductor 66 is raised to higher negative value by pulse PP. This negative pulse typically is −40 to −50 volts which is sufficient to effect an avalanche injected charge on the floating gate transistors TS3 and TS4 of circuit 32′.

The operation of the STS circuit in column select switches 44 is quite analogous to that of circuit STC in FIG. 3 and so will only briefly be explained. In order to select column conductor 68, the column decoder 48 applies a 0 volt signal on line 46 to the gate electrode of transistor TS11 inhibiting its conduction. The negative bias DC voltage on conductor 66 causes transistor TS12 to conduct. Thus, the high negative potential pulse PP when it occurs is coupled to conductor 68 through TS12. During segmentation programming, when it is desirable not to select conductor 68, a negative signal is applied to the gate terminal of TS11 via conductor 46, driving TS11 into conduction and clamping the gate terminal of TS12 to ground and inhibiting its conduction. With TS12 not conducting, the column conductor 68 will not be addressed. Resistor RS1′, which is connected from ground to the source electrode of TS12, serves to keep conductor 68 at ground potential when TS12 is not conducting.

Transistor T13 of the row switches 40 in combination with its associated circuit comprised of T8, RR1 and RR1′ functions to address conductor 24-1′ in a way analogous to that just described in connection with the STS circuit and the addressing of conductor 68. Conductor 47 from the row decoder 50 is connected to the gate electrode of transistor T13. The source electrode of T13 is connected to ground, and its drain electrode is connected to the gate electrode of T8. Resistor RR1′ connects the gate electrode of T8 to the programming pulse line 66, and resistor RR1 connects the T8 source electrode of T8 to ground. As previously mentioned, the operation of these row select switches is quite similar to that of the STS circuits as just described.

The invention provides the capability of forming shift registers, binary counters, and a variety of other logic systems. This capability is exemplified in FIG. 7, which illustrates a synchronous parallel-carry counter wherein logic elements within the circuit array are interconnected to form J-K flip-flop counter stages. In view of the complexity of the circuitry represented in FIG. 7, however, it will be helpful to first describe the basic structure and operation of a conventional J-K flip-flop counter stage utilizing standard logic symbols as illustrated in FIG. 5.

Figure 5:
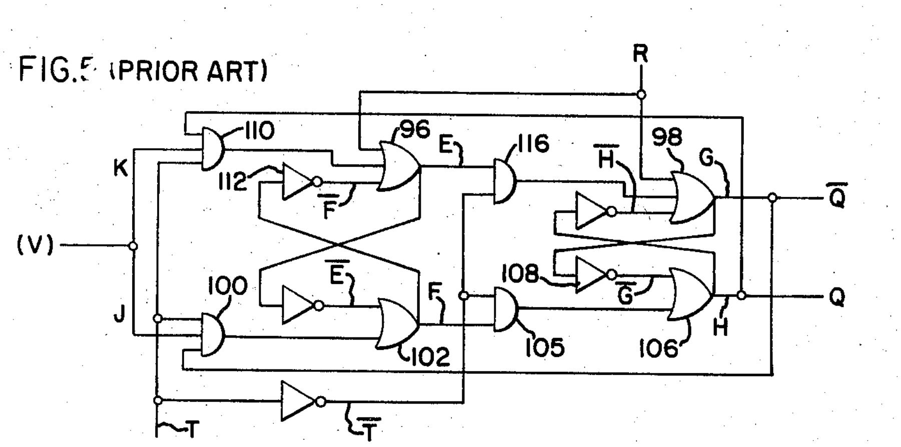
FIG.5 (PRIOR ART)
FIGS. 5 and 6 are logic schematic diagrams of a conventional J-K flip-flop and binary counter, respectively, which are included as aids in the understanding of FIG. 7.

In FIG. 5 there is shown applied to the circuit a trigger or clock signal designated T which is a repetitive positive and negative going pulse. It is significant to note that in the normal operation of a J-K flip-flop, data is placed into the flip-flop when T goes positive and the output state of the flip-flop changes when T goes negative. Hence any change in the Q and $\overline{Q}$ outputs from the flip-flop occurs after T has gone negative. Reference is now made to an input potential designated (V) which is applied to both J and K inputs of the flip-flop. When the J and K inputs are thus tied together to a common potential, the flip-flop will toggle or operate as a counter as is well known.

Figure 6:
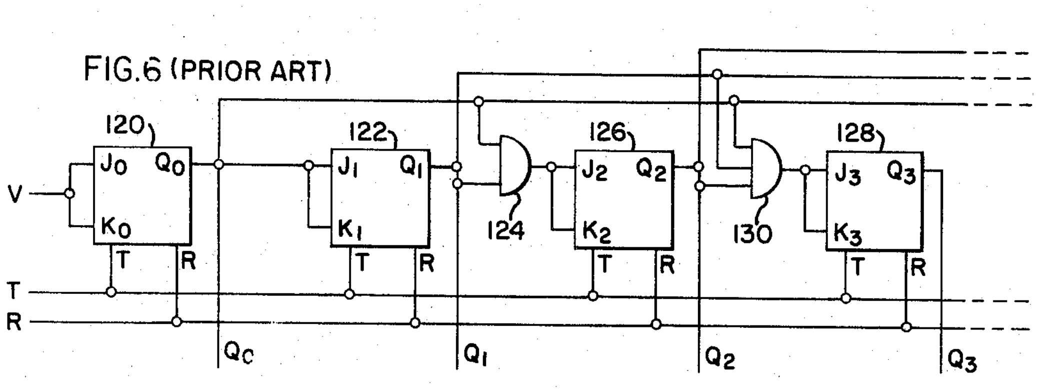
FIG.6 (PRIOR ART)

The following Boolean equations for the flip-flop of FIG. 5 are tabulated for reference purposes:

$E = HT + \overline{F} + R$ $F = GT + \overline{E}$ $G = E\overline{T} + \overline{H} + R$ $H = F\overline{T} + \overline{G}$ Reference is now made to FIG. 6 which discloses in standard block diagram form a combination of four J-K flip-flops like that of FIG. 5 to make up a synchronous parallel-carry counter. It will be noted that the first flip-flop stage 120 has inputs $J_o$ and $K_o$ tied together, causing the flip-flop to toggle. In similar fashion, the output $Q_o$ from flip-flop 120 is applied simultaneously to inputs $J_1$ and $K_1$ of the second flip-flop counter stage 122. The output $Q_1$ from flip-flop 122 is connected as one input to an AND gate 124, also receiving as another input the signal $Q_o$ from flip-flop 120. The output of AND gate 124 is connected to inputs $J_2$ and $K_2$ of another binary stage 126, thus causing 126 also to toggle. The fourth flip-flop stage 128 also operates as a toggle by receiving at its $J_3$ and $K_3$ inputs an output from an AND gate 130. AND gate 130 receives input signals $Q_o$, $Q_1$ and $Q_2$ from counter stages 120, 122, and 126 respectively.

From the previous description of FIG. 5, it will be recalled that when a J-K flip-flop is connected to operate as a toggle, the output state of the flip-flop will change each time the clock signal T goes in a negative direction. The output $Q_o$ of stage 120 accordingly will change state each time the clock signal makes a negative transition, and stage 122 also will change state each time the clock signal makes a negative transition when the output signal $Q_o$ of stage 120 is a binary 1. Counter stage 126 will similarly change state when AND gate 124 is enabled by the application of signals $Q_o$ and $Q_1$. The three inputs to AND gate 130, $Q_o$, $Q_1$ and $Q_2$ will enable the gate whenever stages 120, 122 and 126 are in the set states. Thus, when the clock signal T goes negative, stage 128 will change state.

It can be seen from the logic structure of FIG. 6 that the circuit forms a conventional synchronous parallel-carry counter of well known type. As shown by the dashed lines in the drawing going off the top of $Q_o$, $Q_1$, $Q_2$ and $Q_3$, it is possible to extend the counter to as many stages as desired.

Figure 7:
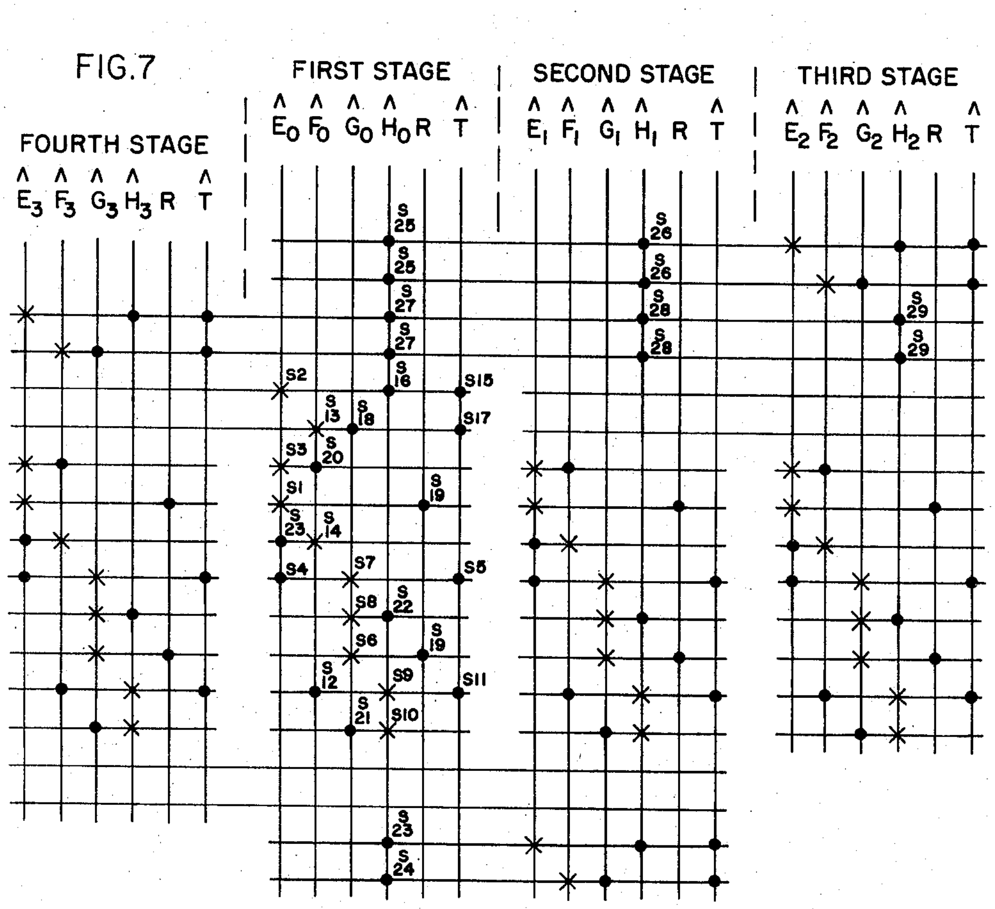
FIG. 7 is a logic schematic diagram of a binary counter of the kind illustrated in FIG. 6, implemented in segmented associative logic circuitry in accordance with the invention.

Reference is now made to FIG. 7 which illustrates a four stage synchronous parallel carry counter like that of FIG. 6 implemented in segmented logic array form in accordance with the invention. It will be noted in FIG. 7 that each of the counter stages is divided into groups of column conductors by dashed lines. Further, it will be noted that the column and row conductors contain logic term nomenclature (signal designations) corresponding to that previously described in connection with FIGS. 5 and 6, and that each of the logic terms contains a subscript identifying it with its associated stage. For example, the logic terms $E_o$, $F_o$, $G_o$ and $H_o$ correspond to logic terms of signals generated within the first stage. The same analogy applies to the second, third and fourth stages.

Each of the stages of FIG. 7 is comprised of a plurality of logic elements interconnected at intersecting column and row conductors to form AND gates each designated by a dot (.) and OR gates each designated by an *x*.

As an aid to the understanding of FIG. 7, a correspondence will be noted where applicable in the following discussion of those combinations of dots and X's comprising equivalent AND gates and OR gates and the corresponding logic gates previously described by reference to FIGS. 5 and 6. Since each of the counter stages of FIG. 7 is substantially the same, only the first stage will be described.

The logic elements S1, S2 and S3 in FIG. 7 comprise an OR gate corresponding to OR gate 96 of FIG. 5. Two logic elements S4 and S5 comprise an AND gate corresponding to gate 116. Similarly, the OR gate 98 is represented by a group of logic elements S6, S7 and S8, for providing a term $G_o$ to logic inverter 108. Note that for simplicity inverters are not represented in FIG. 7; thus, literals G and $\overline{G}$ are represented together by the symbol $\hat{G}$. Logic elements S9 and S10, corresponding to OR gate 106 of FIG. 6, generate an output term $H_o$. The AND gate 105 is represented by logic elements S11 and S12 the output of which is applied to element S9. Another OR gate, corresponding to gate 102, comprises logic elements S13 and S14 and generates the term $F_o$. Two pairs of logic elements S15, S16 and S17, S18 comprise AND gates corresponding to gates 110 and 100.

In addition to the AND and OR gates just described, a plurality of gating logic elements are included in each of the stages of FIG. 7 for gating selected ones of the logic terms to the inputs of selected ones of the gates. One of these gating elements S19 receives the reset term R and passes it to the input of logic elements S1 and S6. The R and T signals are applied redundantly at each stage. The term $F_o$ from inverter 112 is provided as an input to element S3 by a gating element S20. Again note that in FIG. 7 no distinction is made between literals representing the true and complement form of the variables since both are assumed available on each column. In a fashion similar to element S20, gating elements S21 and S22 provide the term $\overline{G}_o$ and $\overline{H}_o$ to the inputs of elements S10 and S8 respectively.

Referencing FIGS. 5, 6 and 7, term $Q_o$ ($H_o$) from the first stage 120 is connected from the output of OR gate 106 to the J, K inputs of the second stage 122 at logic elements S23 and S24. The signals to the J2, K2 inputs of the third stage 126 are applied through two logic elements S25 and S26 corresponding to AND gate 124 of FIG. 6. Term $Q_o$ ($H_o$) from OR gate 106 (S9 and S10) is applied to elements S25, and term Q1 (H1) from the second stage (OR gate 106) is applied to elements S26. The signals to the J3, K3 inputs of the fourth stage 128 are applied through three logic elements S27, S28 and S29 corresponding to AND gate 130 of FIG. 6. Term $Q_o$ ($H_o$) from OR gate 106 is applied to elements S27, term Q1 (H1) from the second stage is applied to elements S28, and term Q2 (H2) from the third stage is applied to elements S29.

From the foregoing description of various embodiments of the invention, it is apparent that a wide range of logic circuits may be implemented either by initial fabrication or by subsequent programming of a basic array structure into segmented groups of logic elements. Each such segment is capable of forming Boolean functions of applied binary variables while the combined segments are capable of forming more complex functions of these variables. By thus segmenting selected ones of the row or column conductors in the circuit to establish patterns or groups of logic gates it is possible to make optimum use of the logic elements in an associative logic circuit of given size.

Although the configurations illustrated in the drawings and described in the foregoing utilize electrical programming, it is readily possible also to accomplish programming in accordance with the invention using custom mask, laser micromachining and other such known techniques. These and many other modifications of the invention will occur to those skilled in the art and it therefore should be understood that the appended claims are intended to cover all such modifications as fall within the true spirit and scope of the invention.

What is claimed as new and desired to be secured by Letters Patent of the United States is:

1. An associative logic circuit for implementing Boolean functions comprising:

an array of logic elements each having an input terminal and an output terminal, said logic elements being arranged in orthogonally disposed columns and rows each including a respective column or row conductor, at least one of said rows of logic elements being segmented into a plurality of logic element groups by division of its respective row conductor into a like plurality of electrically isolated collinear segments, with each group thus formed including at least one input logic element and at least one output logic element and further including at least one load element;

one or more of said column conductors associated with each said group of logic elements being connected to the output terminals of selected output logic elements of that group and connected across said load element associated therewith whereby the column conductor and the logic and load elements thus connected provide a Boolean function output which serves as input to a selected input logic element of another group and may also serve as an array output;

said row conductor segments associated with each said group of logic elements being connected to the output terminals of selected input logic elements of that group and connected across said load elements associated therewith whereby the row conductor segments and the logic and load elements thus connected provide a Boolean function output which serves as input to a selected output logic element of that group and may also serve as an array output; and input means providing input variables in binary signal form into said array, and means for applying said input binary signals to selected ones of said column conductors and said row conductor segments, whereby the logic elements of said array as connected through said row and column conductors may generate complex multiple output Boolean functions of individual array input variables and lower level functions of these variables generated within the array.

2. An associative logic circuit as set forth in claim 1, wherein:

said logic elements each comprise a diode having first and second terminals defined in relation to diode polarity, the input and output terminals of said input logic elements corresponding to the diode first and second terminals respectively, and the input and output terminals of said output logic elements corresponding to the diode second and first terminals respectively, and wherein said load elements each comprise a resistor.

3. An associative logic circuit as set forth in claim 1, wherein:

said logic elements each comprise a diode and link connected as a series circuit having first and second terminals defined in relation to diode polarity, certain of said links being open circuited while others form conductive electrical circuits, the input and output terminals of said input logic elements corresponding to said first and second terminals respectively, and the input and output terminals of said output logic elements corresponding to said second and first terminals respectively;

a plurality of segmentation links connecting selected conductors of adjacent ones of said groups, certain of said links forming conductive electrical circuits for connecting such adjacent groups whereby they function together as a single group, others of said links being open-circuited to thus segment the adjacent groups.

4. An associative logic circuit as set forth in claim 3, including:

row and column addressing means for addressing each logic element link and each segmentation link for electrical modification of the electrical conductivity of selected ones of said links.

5. An associative logic circuit as set forth in claim 4, wherein:

said row conductors are connected to said row addressing means by isolation means through which addressing signals may be provided to the groups in that row, said isolation means comprising at least one diode having first and second terminals defined in relation to diode polarity in the same way as with said logic element, said diode having its first and second terminals connected to said row conductor and said row addressing means respectively;

a load element comprising a series resistor and diode having first and second terminals defined in relation to diode polarity in the same way as with said logic element series circuit, said load element having its first terminal connected to said row conductor, and wherein:

said column load element comprises a resistor.

6. An associative logic circuit as set forth in claim 4, wherein:

said row conductors are connected to said row addressing means by isolation means through which addressing signals may be provided to the groups in that row, said isolation means comprising a transistor having base, emitter and collector electrodes, a row load resistor and a diode having first and second terminals defined in relation to diode polarity in like way with said logic elements, said transistor base electrode being connected through said row load resistor to said row addressing means, said transistor emitter electrode being connected to an associated row conductor, and said transistor collector electrode being connected to said diode first terminal with said diode second terminal being in turn connected to said column address means, said transistor being of such conductivity type as to permit normal collector current with said diode so connected; and wherein:

said column load element comprises a resistor.

7. An associative logic circuit as set forth in claim 1, wherein:

said logic elements each comprise an MOS transistor having gate, drain, and source electrodes, the input and output terminals of said input logic elements corresponding to said gate and drain electrodes respectively, and the input and output terminals of said output logic elements corresponding to said gate and source electrodes respectively.

8. An associative logic circuit as set forth in claim 1, wherein:

said logic elements each comprise a series connection of two MOS transistors having first, second and third terminals corresponding to the gate and source terminals of a first transistor and the drain electrode of a second transistor respectively, said second transistor having a floating gate electrode insulated from all circuit conductors, the input and output terminals of said logic elements corresponding to said first and third terminals respectively.

9. An associative logic circuit as set forth in claim 8, including:

a segmentation element comprising a floating gate MOS transistor having source and drain terminals connected to certain of said adjacent collinear row conductor segments and sharing the floating gate electrode of an associated logic element, said segmentation elements being capable of joining selected ones of said row conductor segments whereby the logic element groups associated therewith function together as a single group.

10. An associative logic circuit for implementing Boolean functions comprising:

an array of logic elements arranged in orthogonally disposed columns and rows;

a plurality of row conductors each associated with a row of said logic element array, a first of said row conductors being segmented to form at least two electrically isolated collinear segments with each such segment having associated therewith a group of at least two logic elements, a second of said row conductors being unsegmented and electrically continuous between selected columns of said logic element array including at least one column disposed on each side of the point of segmentation of said first row conductor, said second row conductor having associated therewith a group of at least two logic elements;

a plurality of column conductors each associated with a column of said logic element array with one of the column conductors of said selected array columns providing connection between a logic element of the group associated with one of said first row conductor segments and a logic element of the group associated with said second row conductor, and with another of the column conductors of said selected array columns providing connection between a logic element of the group associated with said second row conductor and a logic element of the group associated with another of said first row conductor segments;

input means providing input variables in binary signal form to selected ones of said conductors and thereby to the logic elements of the associated groups, whereby the logic elements of said array as connected through said row and column conductors may generate multiple output Boolean functions of individual array input variables.

* * * * *